United States Patent
Sato

(10) Patent No.: US 9,453,963 B2
(45) Date of Patent: Sep. 27, 2016

(54) DUST PROOFING SHUTTER BUILT-IN ADAPTER OF LC TYPE OPTICAL CONNECTOR

(71) Applicant: SANWA DENKI KOGYO CO., LTD., Tokyo (JP)

(72) Inventor: Takashi Sato, Tokyo (JP)

(73) Assignee: SANWA DENKI KOGYO CO., LTD., Tokyo (JP)

( * ) Notice: Subject to any disclaimer, the term of this patent is extended or adjusted under 35 U.S.C. 154(b) by 76 days.

(21) Appl. No.: 14/277,175

(22) Filed: May 14, 2014

(65) Prior Publication Data

US 2015/0078710 A1    Mar. 19, 2015

(30) Foreign Application Priority Data

Sep. 17, 2013   (JP) ................................ 2013-191296

(51) Int. Cl.
  *G02B 6/24*   (2006.01)
  *G02B 6/00*   (2006.01)
  *G02B 6/38*   (2006.01)

(52) U.S. Cl.
  CPC ............. *G02B 6/241* (2013.01); *G02B 6/3849* (2013.01); *G02B 6/3825* (2013.01); *G02B 6/3893* (2013.01)

(58) Field of Classification Search
  CPC ........... G02B 6/24; G02B 6/241; G02B 6/00
  See application file for complete search history.

(56) References Cited

U.S. PATENT DOCUMENTS 5,506,922 A  *  4/1996  Grois ................... G02B 6/3825
  385/75
5,608,501 A  *  3/1997  Makino ............. G03G 15/0896
  399/103

(Continued)

FOREIGN PATENT DOCUMENTS

CH         705 355 A1    2/2013
JP       2008-26778 A    2/2008

(Continued)

OTHER PUBLICATIONS

European Search Report for EP 14 18 2572 on Mar. 4, 2015.

*Primary Examiner* — Kaveh C Kianni
(74) *Attorney, Agent, or Firm* — Bacon & Thomas, PLLC

(57) ABSTRACT

The invention can prevent a leading end of a ferrule including a core portion from being damaged in an erroneous insertion. A shutter plate is provided with a clearance for receiving in a non-contact manner a leading end portion of a ferrule which is inserted from a diagonally upward direction side before a fitting portion. The clearance is formed into a rectangular shape, a trapezoidal shape, a circular arc shape, a bowl-like recess shape or an opening shape from a front surface side of the shutter plate toward an inner side, and the shutter plate is structured such that the shutter plate is pushed away and opened by a leading end opening edge portion of a coupling sleeve which is provided so as to cover a periphery of the ferrule, at the same time of receiving the leading end portion of the ferrule by the clearance in a non-contact state.

4 Claims, 13 Drawing Sheets

(56) References Cited

U.S. PATENT DOCUMENTS

| | | | | |
|---|---|---|---|---|
| 5,825,955 A * | 10/1998 | Ernst | | G02B 6/3825 385/38 |
| 6,004,043 A * | 12/1999 | Abendschein | | G02B 6/3825 385/76 |
| 6,247,849 B1 * | 6/2001 | Liu | | G02B 6/3849 385/55 |
| 6,264,374 B1 * | 7/2001 | Selfridge | | G02B 6/3825 385/60 |
| 6,332,781 B1 * | 12/2001 | Ito | | H01R 13/187 439/138 |
| 6,352,375 B1 * | 3/2002 | Shimoji | | G02B 6/4296 385/139 |
| 6,461,054 B1 * | 10/2002 | Iwase | | G02B 6/3849 385/70 |
| 6,471,412 B1 * | 10/2002 | Belenkiy | | G02B 6/3825 385/137 |
| 6,554,482 B1 * | 4/2003 | Matasek | | G02B 6/3825 385/136 |
| 6,595,696 B1 * | 7/2003 | Zellak | | G02B 6/3825 385/72 |
| 6,685,362 B2 * | 2/2004 | Burkholder | | G02B 6/3849 385/78 |
| 6,793,399 B1 * | 9/2004 | Nguyen | | G01M 11/088 356/241.1 |
| 7,315,682 B1 * | 1/2008 | En Lin | | G02B 6/3849 385/139 |
| 7,661,887 B2 * | 2/2010 | Nakagawa | | G02B 6/4296 385/70 |
| 7,972,066 B1 * | 7/2011 | Lin | | G02B 6/3825 385/53 |
| 8,708,579 B2 * | 4/2014 | Shiratori | | G02B 6/322 385/89 |
| 2002/0178568 A1 * | 12/2002 | Ohori | | H01L 21/67369 29/426.5 |
| 2004/0033030 A1 * | 2/2004 | Ohbayashi | | G02B 6/4296 385/88 |
| 2004/0067667 A1 * | 4/2004 | Kuroki | | H01R 13/4532 439/138 |
| 2004/0223701 A1 * | 11/2004 | Tanaka | | G02B 6/3825 385/55 |
| 2004/0224544 A1 * | 11/2004 | Suwa | | G06K 13/0875 439/142 |
| 2005/0008300 A1 * | 1/2005 | Kamarauskas | | G02B 6/3825 385/55 |
| 2005/0226588 A1 * | 10/2005 | Pons | | G02B 6/4457 385/135 |
| 2005/0249440 A1 * | 11/2005 | Yokoo | | F16C 17/026 384/100 |
| 2005/0286833 A1 * | 12/2005 | Kramer | | G02B 6/3825 385/55 |
| 2006/0153503 A1 * | 7/2006 | Suzuki | | G02B 6/3807 385/53 |
| 2007/0019265 A1 * | 1/2007 | Park | | B41J 2/471 359/18 |
| 2007/0019913 A1 * | 1/2007 | Iwai | | G02B 6/3825 385/56 |
| 2007/0217749 A1 * | 9/2007 | Jong | | G02B 6/3849 385/88 |
| 2008/0247709 A1 * | 10/2008 | Eguchi | | G02B 6/3849 385/60 |
| 2009/0226141 A1 * | 9/2009 | Lin | | G02B 6/3825 385/134 |
| 2010/0054665 A1 * | 3/2010 | Jones | | G02B 6/3849 385/59 |
| 2010/0251769 A1 * | 10/2010 | Samuels | | A44C 25/004 63/23 |
| 2011/0038581 A1 * | 2/2011 | Mudd | | G02B 6/3849 385/53 |
| 2012/0321266 A1 * | 12/2012 | Lin | | G02B 6/3825 385/134 |
| 2013/0195405 A1 | 8/2013 | Sanders et al. | | |

FOREIGN PATENT DOCUMENTS

| | | |
|---|---|---|
| JP | 2008-225133 A | 9/2008 |
| JP | 2009 042353 A | 2/2009 |

* cited by examiner

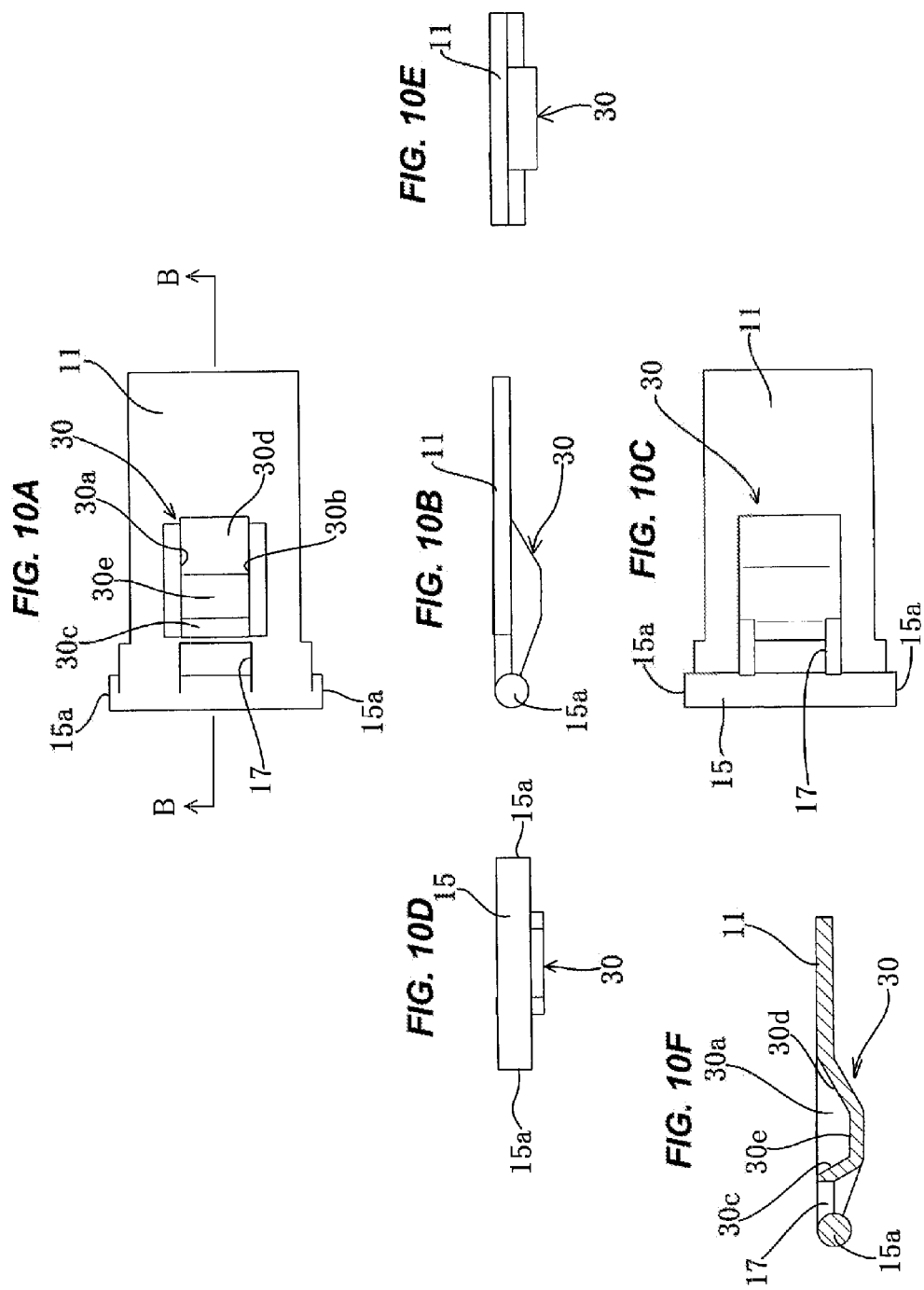

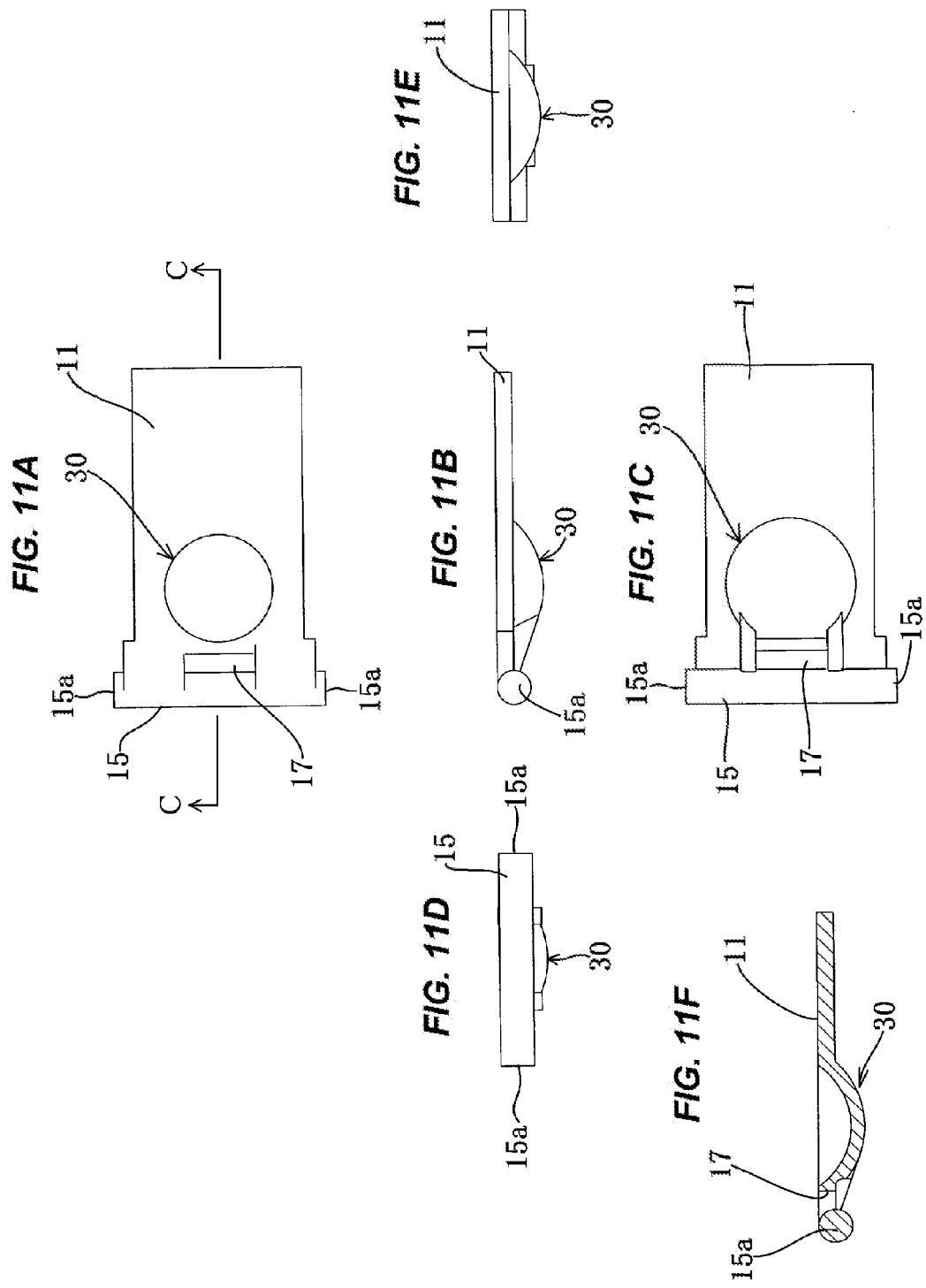

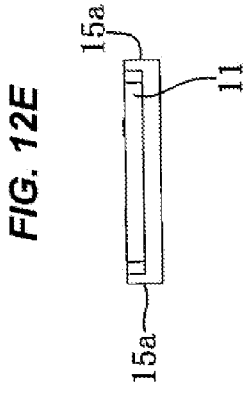
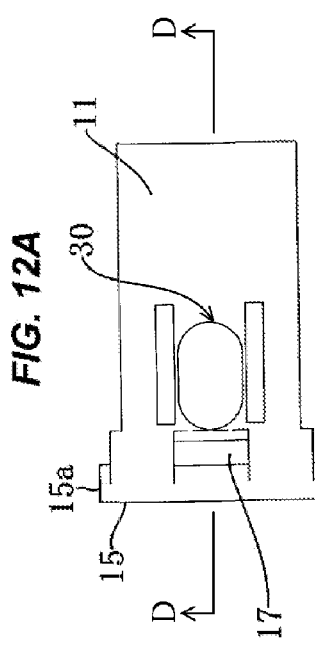
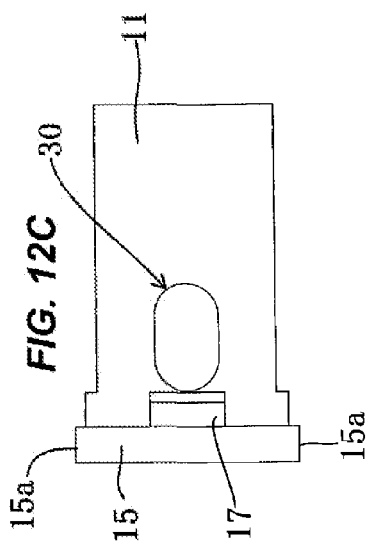
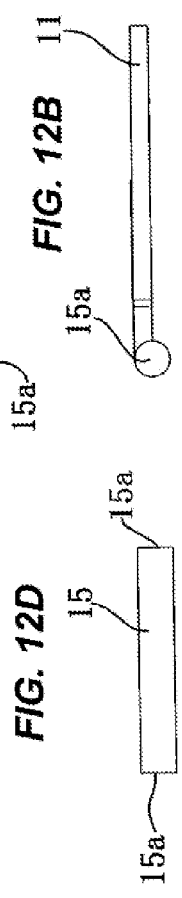
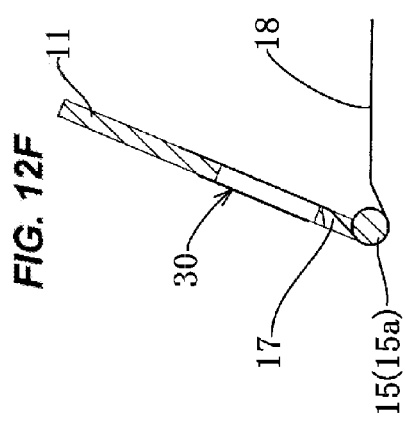
FIG. 12A  FIG. 12B  FIG. 12C  FIG. 12D  FIG. 12E  FIG. 12F

DUST PROOFING SHUTTER BUILT-IN ADAPTER OF LC TYPE OPTICAL CONNECTOR

BACKGROUND OF THE INVENTION

1. Field of the Invention

The present invention relates to a dust proofing shutter built-in adapter of an LC type optical connector which interconnect a pair of opposed LC type optical connector plugs.

2. Description of the Conventional Art

Conventionally, as shown in patent document 1 which is a prior application of the present patent application, an adapter for an optical connector has been proposed by the applicant of the present invention, the adapter for the optical connector being provided with a shutter plate which integrally has a support shaft in its lower end so as to close a fitting portion of the optical connector of the connector housing in a state of being arranged diagonally in the fitting portion, and rotatably bears protruding portions provided in both ends of the support shaft in a lower portion of the fitting portion of the optical connector of the connector housing, and a leaf spring which energizes the shutter plate in a closing direction, and being structured such that the shutter plate is opened against a pressing force of the leaf spring by fitting the optical connector to the fitting portion of the connector housing.

Further, as shown in patent document 2 and patent document 3 which are prior applications by the applicant of the present invention, there has been proposed by the applicant of the present invention an interconnecting adapter for LC type optical connectors which can achieve an improvement of a workability and a cost reduction on manufacturing, and can prevent a retaining capacity of an LC type optical connector plug from being lowered, by provision of a housing constructed by an integral structure which is open in both ends and can accept the LC type optical connector plug from both directions, for the purpose of interconnecting a pair of opposed LC type optical connector plugs.

In the meantime, the conventional adapter for the LC type optical connector is structured such that optical axes of the LC type optical connector plugs are aligned with each other, the LC type optical connector plugs being fitted into fitting ends in both ends of a housing. At this time, in a state in which the LC type optical connector is not fitted into one fitting end, when an optical part which is associated with the LC type optical connector plug connected to the other fitting end is under an operating state, a harmful laser beam, for example, having a power of about 5 mW is conducted to the one fitting end, and there is a risk that the laser beam seriously harms a body of a worker, particularly, eyes of the worker in a work for fitting the LC type optical connector plug into the one fitting end. Further, there has been a problem that a foreign material or a dust enters into an inner portion from the fitting end, whereby there is a risk of generation of defective connection.

Accordingly, the applicant of the present invention has proposed an LC type optical connector interconnecting adapter which is provided with the shutter plate according to the structure shown in the patent document 1 mentioned above in the connector housing shown in the patent document 2 and the patent document 3, so as to prevent the LC type optical connector plug from seriously harming a body of a worker, particularly, eyes of the worker in a work for fitting the LC type optical connector plug having various concavo-convex shapes, securely prevent a foreign material from entering into an inner side of a fitting end and securely prevent a defective connection caused by the foreign material intrusion.

In other words, the LC type optical connector interconnecting adapter is structured, as shown in FIG. 13, such that fitting portions A and B of LC type optical connector plugs P1 and P2 are respectively provided in both ends of a connector housing 101 so that optical axes are aligned, a sleeve holder 105 is arranged in an inner portion of the connector housing 101, the sleeve holder 105 installing and retaining each of ferrules 124 in leading end portions of the LC type optical connector plugs P1 and P2 which are inserted from the fitting portions A and B in both ends, a shutter plate 111 and a leaf spring 118 are arranged at least within the one fitting portion A of the connector housing 101, the shutter plate 111 closing the fitting portion A in a diagonally arranged state, and the leaf spring 118 energizing the shutter plate 111 in a closing direction, and the shutter plate 111 is opened against a pressing force of the leaf spring 118 by inserting the LC type optical connector plug P1 from the fitting portion A of the connector housing 1, and fitting the LC type optical connector plug P1 to the sleeve holder 105.

PRIOR ART DOCUMENT

Patent Document

Patent Document 1: Japanese Unexamined Patent Publication No. 2008-225133
Patent Document 2: Japanese Unexamined Patent Publication No. 2008-26778
Patent Document 3: Japanese Patent No. 4768539

SUMMARY OF THE INVENTION

Problem to be Solved by the Invention

As described above, in the case of the LC type optical connector interconnecting adapter shown in FIG. 13, since the shutter plate 111 itself is diagonally arranged in the fitting portion A, the shutter plate 111 is opened in such a manner that a corner portion in a leading end of the ferrule 124 pushes away a front surface of the shutter plate 111 as long as the leading end of the ferrule 124 of the LC type optical connector plug P1 is securely inserted along a horizontal direction from a near side of the fitting portion A toward an inward direction. Therefore, there is no risk that the core portion in the leading end of the ferrule 124 is damaged by the shutter plate 111.

However, since the shutter plate 111 itself is conventionally formed into the flat plane shape, the leading end of the ferrule 124 including the core portion comes into contact with the front surface of the shutter plate 111, and there is a risk that the leading end damages the leading end of the ferrule 124 and the core portion itself, in the case that the leading end of the ferrule 124 of the LC type optical connector plug P1 is erroneously inserted in a diagonal direction before the fitting portion A.

Accordingly, the present invention is made by taking into consideration the conventionally existing circumstances as mentioned above, and an object of the present invention is to provide a dust proofing shutter built-in adapter of an LC type optical connector which can easily open a shutter plate without contact of a leading end of a ferrule with a front surface of the shutter plate, and can accordingly prevent a leading end of the ferrule including a core portion from being damaged, even in the case that the leading end of the ferrule of an LC type optical connector plug is erroneously inserted in a diagonal direction before a fitting portion of a connector housing.

Means for Solving the Problem

In order to achieve the object mentioned above, according to the present invention, there is provided a dust proofing shutter built-in adapter of an LC type optical connector for interconnecting the LC type optical connectors, the adapter comprising:

fitting portions of LC type optical connector plugs respectively provided in both ends of a connector housing so that optical axes are aligned;

a sleeve holder installing and retaining each of leading end portions of ferrules of the LC type optical connector plugs inserted from the fitting portions in both ends, the sleeve holder being arranged in an inner portion of the connector housing;

a shutter plate which is diagonally arranged and closes the fitting portion;

a leaf spring which energizes the shutter plate in a closing direction;

the shutter plate and the leaf spring being arranged at least within one fitting portion of the connector housing;

the LC type optical connector plug being inserted from a fitting portion of the connector housing; and a leading end portion of the ferrule being fitted to a sleeve holder while opening the shutter plate against a pressing force of the leaf spring, wherein the shutter plate is provided with a clearance for receiving in a non-contact state the leading end portion of the ferrule inserted from a diagonally upward direction side before the fitting portion.

The clearance is formed into a rectangular shape, a trapezoidal shape, a circular arc shape, a bowl-like recess shape or an opening shape from a front surface side of the shutter plate toward an inner side.

The shutter plate is structured such that the shutter plate is pushed away and opened by a leading end opening edge portion of a coupling sleeve which is provided so as to cover a periphery of the ferrule of the LC type optical connector plug, at the same time of receiving the leading end portion of the ferrule by the clearance in a non-contact state.

Effect of the Invention

According to the present invention, even in the case that the leading end of the ferrule of the LC type optical connector plug is erroneously inserted from the diagonally upward direction side before the fitting portion of the connector housing, the shutter plate can be easily opened without contact of the leading end of the ferrule with the front surface of the shutter plate. As a result, it is possible to prevent the leading end of the ferrule including the core portion from being damaged.

Particularly, since the shutter plate is provided with the clearance for receiving in the non-contact state the leading end portion of the ferrule inserted from the diagonally upward direction side before the fitting portion, the shutter plate can be easily opened without contact of the leading end of the ferrule with the front surface of the shutter plate.

Since the clearance is formed into the rectangular shape, the trapezoidal shape, the circular arc shape, the bowl-like recess shape or the opening shape from the front surface side of the shutter plate toward the inner side, it is possible to securely receive in the non-contact state the leading end portion of the ferrule inserted from the diagonally upward direction side before the fitting portion.

Since the shutter plate is structured such that the shutter plate is pushed away and opened by the leading end opening edge portion of the coupling sleeve which is provided so as to cover the periphery of the ferrule of the LC type optical connector plug, at the same time of receiving the leading end portion of the ferrule by the clearance in the non-contact state, the shutter plate can be easily opened only by the leading end opening edge portion of the coupling sleeve while preventing the leading end of the ferrule including the core portion from being damaged.

BRIEF EXPLANATION OF THE DRAWINGS

FIGS. 2A to 2E show the interconnecting adapter for the LC type optical connectors with shutter, in which FIG. 2A is a front elevational view, FIG. 2B is a plan view, FIG. 2C is a side elevational view, FIG. 2D is a bottom elevational view, and FIG. 2E is a back elevational view;

FIGS. 10A to 10F show an example of a shutter structure, in which FIG. 10A is a front elevational view, FIG. 10B is a side elevational view, FIG. 10C is a back elevational view, FIG. 10D is a bottom elevational view, FIG. 10E is a top elevational view, and FIG. 10F is a cross sectional view along a line B-B;

FIGS. 11A to 11F show a modified example of the shutter structure, in which FIG. 11A is a front elevational view, FIG. 11B is a side elevational view, FIG. 11C is a back elevational view, FIG. 11D is a bottom elevational view, FIG. 11E is a top elevational view, and FIG. 11F is a cross sectional view along a line C-C;

FIGS. 12A to 12F show the other modified example of the shutter structure, in which FIG. 12A is a front elevational view, FIG. 12B is a side elevational view, FIG. 12C is a back elevational view, FIG. 12D is a bottom elevational view, FIG. 12E is a top elevational view, and FIG. 12F is a cross sectional view along a line D-D.

DESCRIPTION OF REFERENCE NUMERALS

Figure 1:
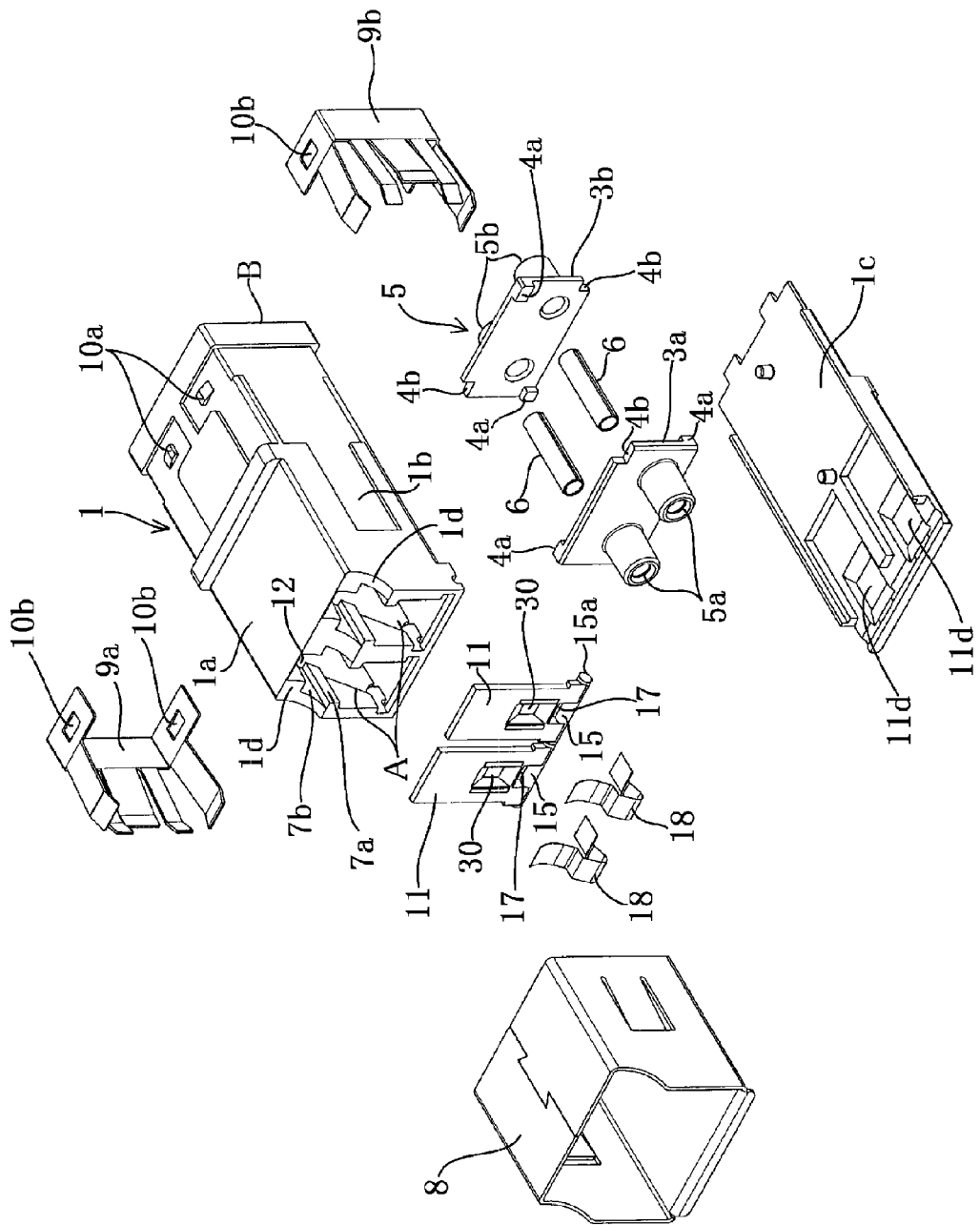
FIG. 1 is an exploded perspective view showing an interconnecting adapter for LC type optical connectors with shutter according to the best mode for carrying out the present invention.
Figure 2:
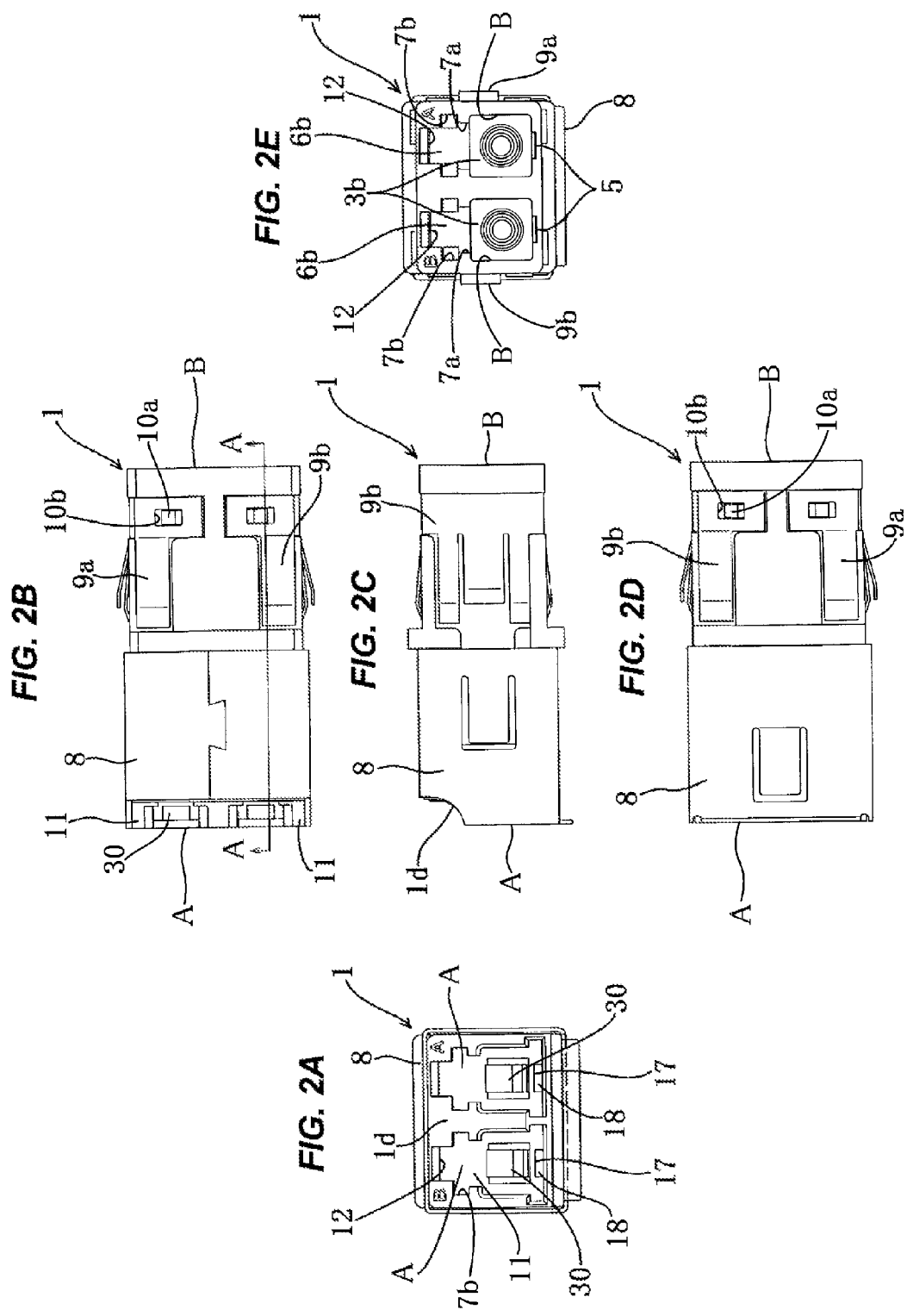

P1, P2 LC type optical connector plug
A one fitting portion
B other fitting portion
1 connector housing
1a upper side wall
1b right and left side walls
1c bottom wall
1d notch portion
3a, 3b joint end wall member
4a fitting pawl
4b engagement portion
5 sleeve holder
5a one cylinder
5b other cylinder
6 split sleeve
6a fitting concave portion
6b partition projection
7a guide protrusion
7b concave groove portion
8 holder
9a, 9b fixing bracket
10a locking projection
10b locking hole
11 shutter plate
11a concave portion
11c abutting surface
11d opening portion
12 key groove
15 support shaft
15a protruding portion
16 shaft hole
17 opening portion
18 leaf spring
21 coupling sleeve
22 tube for ferrule
23 ferrule frame
24 ferrule
25 coupling
26 main body frame
27 boot
28 release lever
28a engagement projection
29 latch lever
30 clearance
30a left wall surface
30b right wall surface
30c downward side inclined surface
30d upward side inclined surface
30e bottom surface

DETAILED DESCRIPTION OF PREFERRED EMBODIMENTS

A description will be in detail given below of an embodiment according to the present invention with reference to the accompanying drawings.

Figure 9:
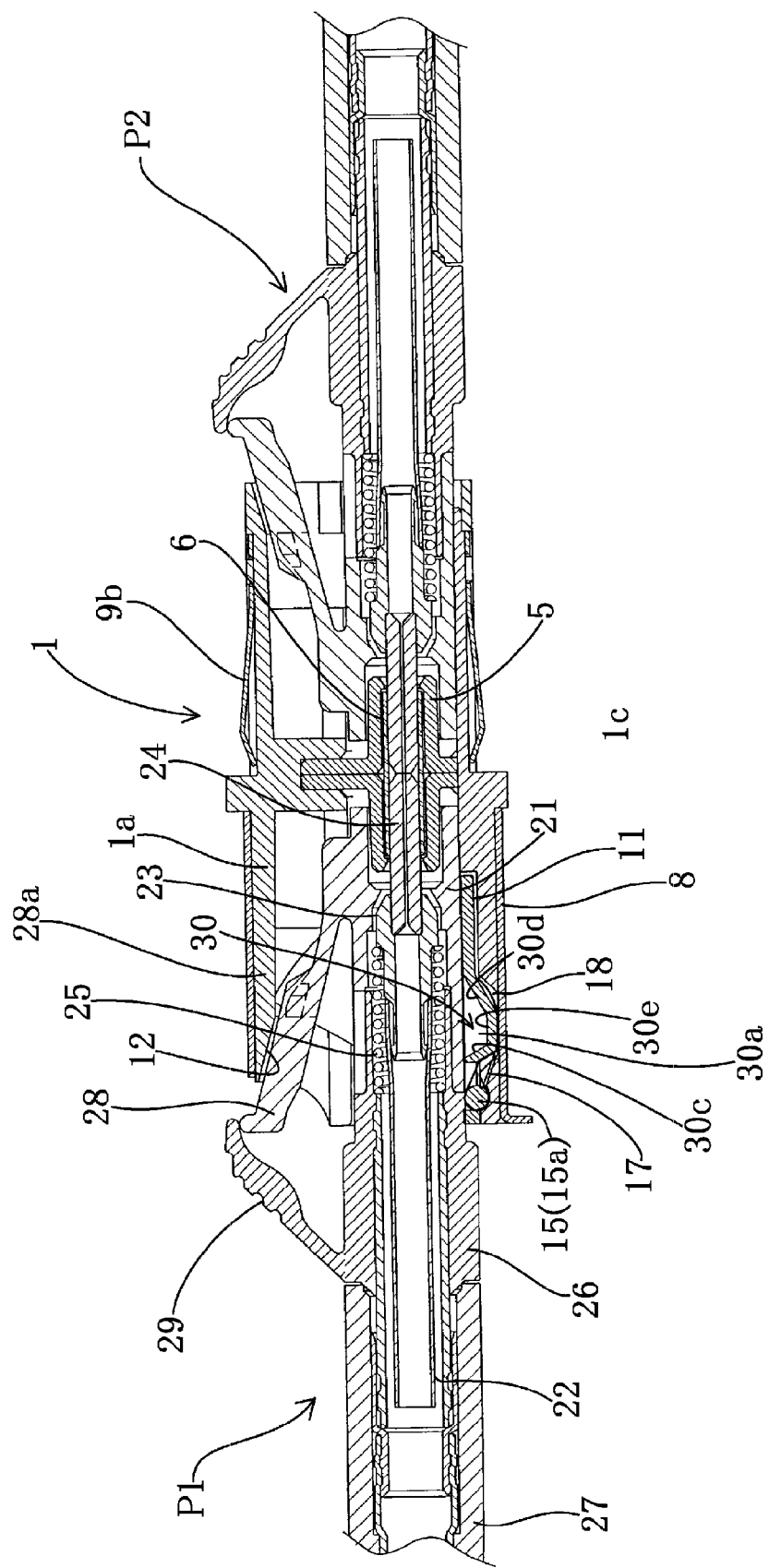
FIG. 9 is a vertical cross sectional view of a state in which the LC type optical connector plug is inserted from both directions of the interconnecting adapter for the LC type optical connectors.

In the present embodiment, as shown in FIGS. 1 to 5, there is provided a connector housing 1 which constructs an interconnecting adapter for two-core LC type optical connectors for interconnecting a pair of opposed LC type optical connector plugs P1 and P2 (refer to FIG. 9).

In the connector housing 1, an upper side wall and right and left side walls 1b are integrally formed into an approximately C-shaped frame form in a front view, and a bottom wall 1c is attached between the right and left side walls 1b so as to be opposed to the upper side wall 1a, whereby the connector housing 1 is wholly formed into a rectangular tube body provided with fitting portions A and B in both ends. The fitting portions A and B can insert a pair of opposed LC type optical connector plugs P1 and P2 from both ends. Further, a rectangular tube shaped holder 8 for fixing the bottom wall 1c mentioned later to the right and left side walls 1b by attaching the bottom wall 1c to a bottom open side of the connector housing 1 is installed to the connector housing 1.

Further, fixing brackets 9a and 9b are installed and fixed to the right and left side walls 1b of the connector housing 1 on the basis of an engagement between locking projections 10a and locking holes 10b. The fixing brackets 9a and 9b are formed by an approximately C-shaped metal frame piece and are provided with a plurality of locking springs for fixing panels. The locking projections 10a are provided in a side of the connector housing 1, and the locking holes 10b are provided in a side of the fixing brackets 9a and 9b.

Figure 3:
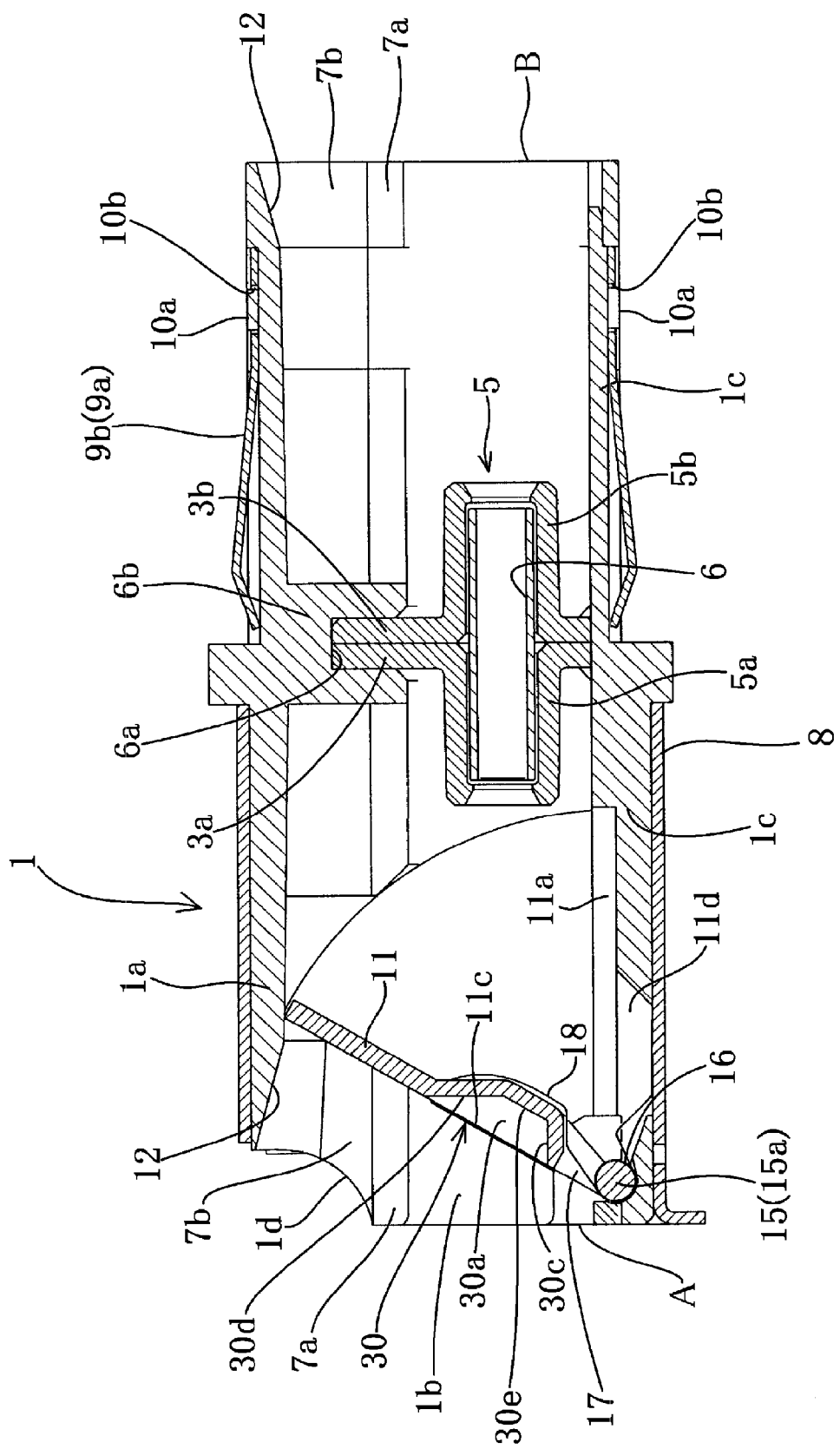
FIG. 3 is an enlarged cross sectional view along a line A-A in FIG. 2B.
Figure 4:
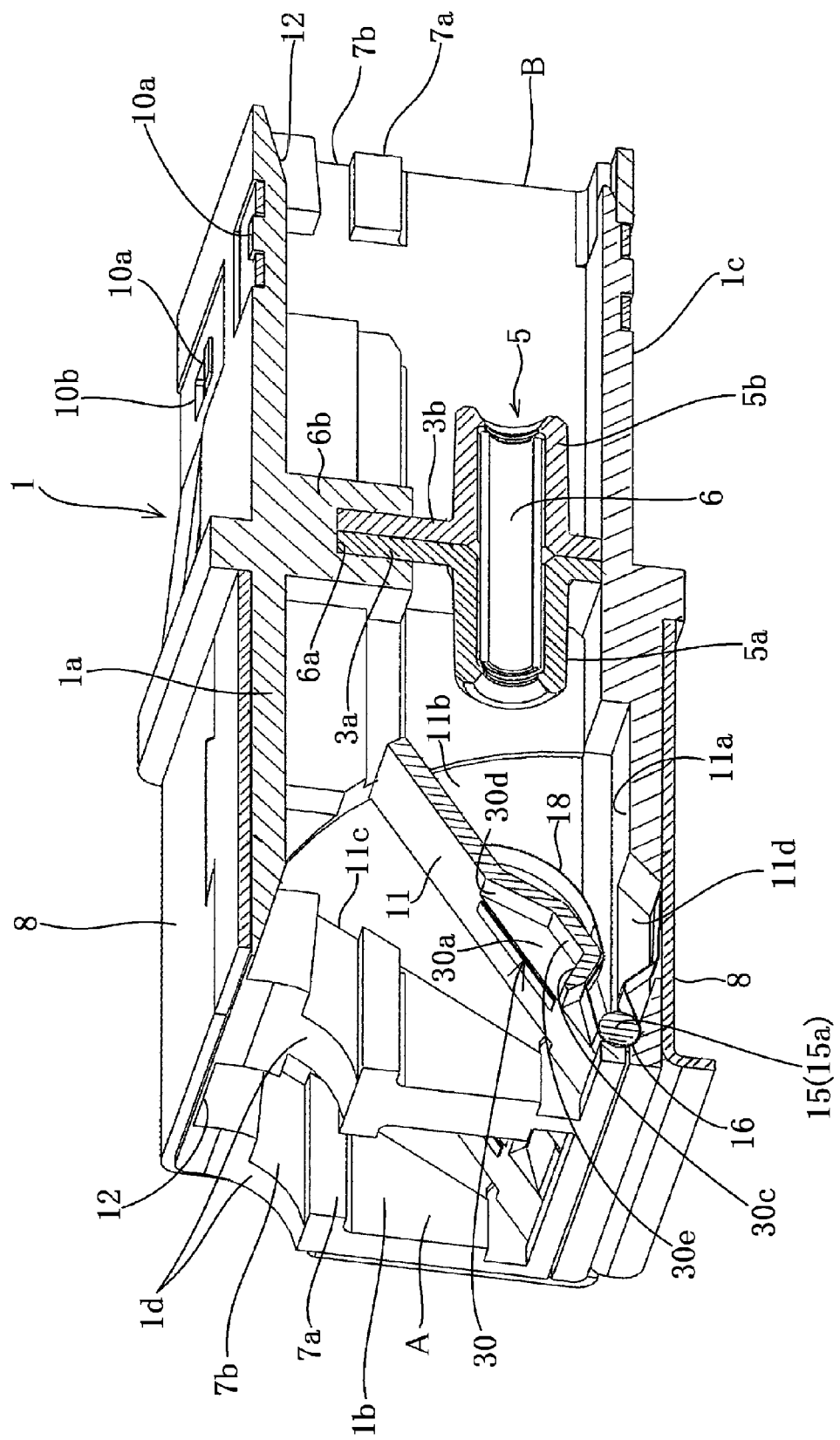
FIG. 4 is a perspective view of a state in which the enlarged cross section along the line A-A in FIG. 2B is seen from a front surface side.
Figure 5:
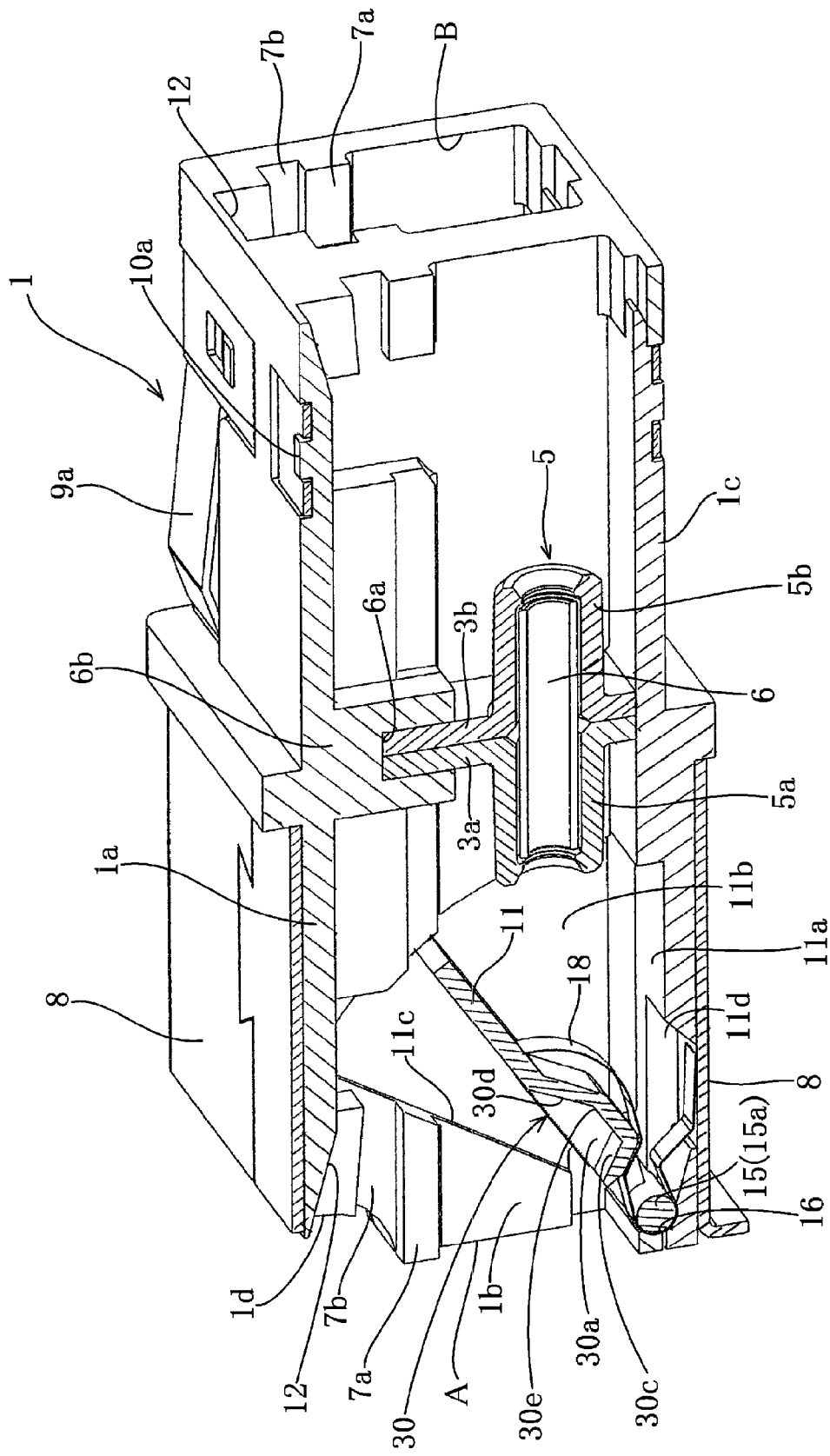
FIG. 5 is a perspective view of a state in which the enlarged cross section along the line A-A in FIG. 2B is seen from a back surface side.

A partition projection 6b is vertically provided in the center of the upper side wall 1a in an inner portion of the connector housing 1 as shown in FIGS. 3 to 5. A fitting concave portion 6a is formed in the center of a lower end of the partition projection 6b. Upper end portions of a pair of joint end wall members 3a and 3b constructing a sleeve holder 5 are fitted into the fitting concave portion 6a in a state in which the upper end portions are aligned with each other. One cylinder 5a is provided in one joint end wall member 3a arranged in the center portion of the connector housing 1 so as to protrude toward the one fitting portion A, and the other cylinder 5b is provided in the other joint end wall member 3b so as to protrude toward the other fitting portion B.

The sleeve holder 5 is formed by engaging and fixing fitting claws 4a and engagement portions 4b which are formed alternately in corner portions of the joint end wall members 3a and 3b so that center axes of both the cylinders 5a and 5b are aligned on an optical axis (refer to FIG. 1). At this time, both the cylinders 5a and 5b are arranged so as to protrude in opposite directions in a state in which rear end surfaces of the cylinders 5a and 5b come into contact with each other via the joint end wall members 3a and 3b. Accordingly, one split sleeve 6 is arranged in both the adjacent cylinders 5a and 5b in a state in which the split sleeve 6 is inward inserted.

Further, as shown in FIGS. 3 to 5, an inward C-shaped concave groove portion 7b is formed in a horizontal direction in an upper side of right and left side walls 1b in an inner portion of the connector housing 1. The concave groove portion 7b is provided with a guide protrusion 7a in a lower side for inserting and guiding the LC type optical connector plugs P1 and P2 along a longitudinal direction. The guide protrusion 7a and the concave groove portion 7b correspond to a concavo-convex outer shape of the LC type optical connector plugs P1 and P2. Further, a key groove 12 is formed in the center of the upper side wall 1a in the one fitting portion A. The key groove 12 is formed into a linear groove line along a direction of an optical axis for guiding when the LC type optical connector plugs P1 and P2 are inserted.

As shown in FIGS. 1 to 9, an arc-shaped notch portion 1d is formed in an upper end of the one fitting portion A of the connector housing 1 which is employed in the embodiment mentioned above. Further, in place of the insertion of the LC type optical connector plug P2 into the other fitting portion B, the other optical part, for example, the SC type optical connector plug or the other plug may be inserted.

A shutter plate 11 for closing the fitting portion A in a diagonal arrangement is arranged in the one fitting portion A of the connector housing 1 so that the shutter plate can be opened and closed in an inner side. In other words, the shutter plate 11 is structured such that a support shaft 15 is integrally provided in a protruding manner at a horizontal position of its lower end, and protruding portions 15a provided in symmetrical positions in both ends of the support shaft 15 are rotatably supported to a shaft hole 16 which is formed over the bottom wall 1c at the right and left opposed positions of the lower portion of the fitting end of the fitting portion A, and the right and left side walls 1b.

Further, a rectangular opening portion 17 is formed approximately in the center of the lower end of the shutter plate 11 where the shutter plate 11 and the support shaft 15 are connected, a leaf spring 18 which is formed by being bend in an approximately L-shaped form and is made of a metal is outward fitted to the center of the support shaft 15 via the opening portion 17, one end of the leaf spring 18 is brought into pressure contact with a rectangular concave portion 11a (having a magnitude and a thickness which correspond to a whole surface of the shutter plate 11) formed in an inner surface of the bottom wall 1c, and the shutter plate 11 is energized in a closing direction by bringing the other end of the leaf spring 18 into pressure contact with the inner side of the shutter plate 11.

Further, as shown in FIGS. 3 to 5, a fan-type recess portion 11b using the shaft hole 16 as a so-called pivot of fan is formed in each of the right and left side walls 1b so that the shutter plate 11 can be swung so as to be opened and closed. At this time, the recess portion 11b is formed by cutting a part of the guide protrusion 7a and the concave groove portion 7b. Further, in an inner wall surface of each of the right and left side walls 1b of the fitting portion A of the connector housing 1, a stepped abutting surface 11c is formed over the guide protrusion 7a and the concave groove portion 7b, in an upper end edge of the recess portion 11b (an end of closing movement of the shutter plate 11), and is structured such as to lock a side surface of a movable portion of the shutter plate 11 when the shutter plate 11 swings in the closing direction.

Accordingly, a recess-shaped clearance 30 is formed in the shutter plate 11 so as to prevent a leading end portion of a ferrule 24 mentioned later (refer to FIGS. 6 and 7) from coming into contact with a front surface of the shutter plate 11, in the case that the LC type optical connector plug P1 is inserted from the diagonally upward direction side before the fitting portion A of the connector housing 1. In other words, the clearance 30 is formed in an upper side of the opening portion 17 of the shutter plate 11 for receiving a leading end side of the ferrule 24 in a non-contact state in a state in which the clearance 30 is recessed approximately in a trapezoidal shape from a front surface side toward an inner side (the clearance 30 protrudes approximately in a trapezoidal shape in a rear surface of the shutter plate 11).

Specifically, as shown in FIGS. 3 to 10, the clearance 30 is formed into an approximately trapezoidal recess constructed by both left and right wall surfaces 30a and 30b which fall away vertical in left and right sides from the front surface of the shutter plate 11, a downward side inclined surface 30c which falls away by forming a sharp inclination from the front surface of the shutter plate 11 in the upper side of the opening portion 17, an upward side inclined surface 30d which falls away by forming a gentle inclination from the front surface of the shutter plate 11 so as to be opposed to the downward side inclined surface 30c, and a rectangular bottom surface 30e which is surrounded by both the left and right wall surfaces 30a and 30b, the downward side inclined surface 30c and the upward side inclined surface 30d.

At this time, the upward side inclined surface 30d of the clearance 30 forms a clearance slope in relation to the leading end portion of the ferrule 24 in the case that the LC type optical connector plug P1 is inserted from the diagonally upward direction before the fitting portion A of the connector housing 1. Further, the downward side inclined surface 30c of the clearance 30 forms a clearance slope in relation to the leading end portion of the ferrule 24 in the case that the LC type optical connector plug P1 is inserted along the horizontal direction before the fitting portion A of the connector housing 1.

Accordingly, the clearance 30 of the shutter plate 11 is structured such that the shutter plate 11 is pushed away and opened by a leading end opening edge portion of a cylindrical coupling sleeve 21 which is provided so as to cover the periphery of the ferrule 24 of the LC type optical connector plug P1, at the same time of receiving the leading end portion of the ferrule 24 in the non-contact state. At this time, since the inward C-shaped concave groove portion 7b with the guide protrusion 7a is formed in the connector housing 1 in the horizontal direction in the lower side of the connector housing 1 for inserting and guiding the LC type optical connector plug P1 in addition to the key groove 12 for guiding at the inserting time of the LC type optical connector plug P1, the LC type optical connector plug P1 itself naturally maintains the horizontal state according to the inserting process.

Further, an opening portion 11d having an approximately trapezoidal cross sectional shape is formed in a rectangular concave portion 11a which is formed in an inner surface of the bottom wall 1c while having a magnitude and a thickness corresponding to a whole surface of the shutter plate 11, for receiving a rear wall surface of the clearance 30 protruding from a rear surface of the shutter plate 11. The opening portion 11d is closed by a rectangular tubular holder 8 which is installed to a lower surface of the bottom wall 1c of the connector housing 1. Further, the leaf spring 18 mentioned above is curved approximately in a circular arc shape toward an inner side in such a manner that the other end supported by the rear surface of the shutter plate 11 avoids the rear wall surface of the clearance 30, and is bent approximately into an L-shaped form so that one end supported to the concave portion 11a in the inner surface of the bottom wall 1c is engaged within the opening portion 11d formed in the concave portion 11a (refer to FIGS. 1 and 8).

The clearance 30 may be formed into a rectangular shape, a circular arc shape, a bowl-like concave shape or an opening shape. A description will be given of various modified examples of the clearance 30.

FIG. 11 shows a modified example in the case that the clearance 30 is formed into a bowl-like recess shape. In other words, the clearance 30 of this shape is formed into a circular shape as seen from a front surface of the shutter plate 11 (refer to FIG. 11A), and formed into a circular arc shape in its cross section. In this case, the other end of the leaf spring 19 energizes the shutter plate 11 in a closing direction by being brought into pressure contact with a rear side surface of the clearance 30. Further, an opening portion 11d approximately formed into a circular arc shape in its cross section is formed in a rectangular concave portion 11a formed in the inner surface of the bottom wall 1c, the opening portion 11d being provided for receiving a rear wall surface of the clearance 30 which protrudes out of the rear surface of the shutter plate 11. Even in the modified example mentioned above, the same operation and effect as those of the present embodiment mentioned above can be achieved.

FIG. 12 shows a modified example in the case that the clearance 30 is formed into an opening shape. In other words, the clearance 30 according to the embodiment is formed into the opening having an oval shape (refer to FIG. 12A) as seen from the front surface of the shutter plate 11. The other end of the leaf spring 18 energizes the shutter plate 11 in a closing direction by being brought into close contact so as to close the rear opening end of the clearance 30. Even in the modified example mentioned above, the same operation and effect as those of the present embodiment mentioned above can be achieved.

The LC type optical connector plug P1 (P2) is provided with a coupling sleeve 21 which is made of a plastic having a comparatively high strength, a tube 22 for ferrule and a ferrule frame 23 which are provided within the coupling sleeve 21, a ferrule 24 which is installed to the ferrule frame 23, a spring 25 which is installed to an outer periphery of a rear end portion of the ferrule frame 23, a main body frame 26 which is fitted to a rear end portion of the ferrule frame 23 via the spring 25 and is made of a plastic, and a boot 27 which is installed to a rear portion of the main body frame 26, as shown in FIG. 9.

Further, as shown in FIGS. 6 to 9, in an outer peripheral surface of the coupling sleeve 21, a release lever 28 is integrally provided in the coupling sleeve 21. The release lever 28 has a pair of right and left engagement projections 28a which are inserted to the inward C-shaped concave groove portions 7b arranged in the upper sides within the fitting portions A and B provided in both ends of the connector housing 1 while engaging, and is provided for carrying out an engagement with the key groove 12 and a release from the key groove 12. The release lever 28 is extended in an inclined manner from a leading end portion of the coupling sleeve 21 toward a rear end portion thereof so as to be away from an outer surface of the coupling sleeve 21 little by little, and the rear end portion protrudes in an inclined manner to an opposite side to the coupling sleeve 21 so as to come into contact with a latch lever 29 which is formed in an outer peripheral surface of the main body frame 26.

The ferrule 24 of the LC type optical connector plug P1 installed from the one opening side (for example, the fitting portion A) of the connector housing 1 is fitted to the one side of the sleeve holder 5, and the ferrule 24 of the LC type optical connector plug P2 light connecter to the LC type optical connector plug P1 is fitted to the other side of the sleeve holder 5, whereby the LC type optical connector plugs are aligned in an axial direction while bringing the leading ends of both the ferrules 24 into contact with each other via the split sleeve 6 which is inward installed over both the cylinders 5a and 5b (refer to FIG. 9).

In place of the structure of the adapter for interconnecting the LC type optical connectors by the two-core connector housing 1 mentioned above, an adapter for interconnecting the LC type optical connectors by the four-core connector housing 1 may be structured.

Next, a description will be given of an example of assembly, use and motion with regard to the best mode structured as mentioned above.

When assembling the adapter for the LC type optical connector, both the cylinders 5a and 5b are aligned their center axes on the optical axis and the joint end wall members 3a and 3b are engaged with and fixed to each other via the fitting claw 4a and the engagement portion 4b, in a state in which the split sleeve 6 is installed between both the cylinders 5a and 5b which form the sleeve holder 5, as shown in FIGS. 1 and 3. Further, the sleeve holder 5 is embedded in the fitting concave portion 6a of the partition projection 6b in the center of the upper side wall 1a of the housing 1.

At the same time, the leaf spring 18 is outward fitted to the center of the support shaft 15 via the opening portion 17 of the shutter plate 11, the protruding portions 15a in both ends of the support shaft 15 of the shutter plate 11 are thereafter mounted to the shaft hole 16 of the bottom wall 1c, and a pair of side walls 1b arranged in the right and left sides of the upper side wall 1a which is formed approximately as the C-shaped form in the front view are respectively embedded on the bottom wall 1c.

Further, the rectangular tubular holder 8 is installed to the connector housing 1, and the bottom wall 1c is fixed to the right and left side walls 1b. At the same time, the fixing brackets 9a and 9b for fixing the panel are respectively installed to the left and right side walls 1b of the connector housing 1.

As this time, as shown in FIG. 3, the one end of the leaf spring 18 is brought into pressure contact with the holder 8 closing the opening portion 11d, via the opening portion 11d which is formed in the concave portion 11a of the bottom wall 1c, and the other end is brought into pressure contact with the rear wall surface of the clearance 30 of the shutter plate 11. Accordingly, the leaf spring 18 energizes the shutter plate 11 approximately in an inclined state in a direction of closing the fitting end in the one fitting portion A. When the shutter plate 11 is opened, the one end of the leaf spring 18 is pinched by the rear wall surface of the clearance 30 and the holder 8 in the opening portion 11d.

Next, when using the adapter for the LC type optical connector, the shutter plate 11 first of all closes the fitting end in the one fitting portion A on the basis of a snapping force of the leaf spring 18 approximately formed into the L-shaped form in an expanding direction, before the LC type optical connector plug P1 is fitted into the one fitting portion A of the connector housing 1. At this time, the side wall of the movable portion of the shutter plate 11 is locked by the stepped abutting surface 11c.

Figure 6:
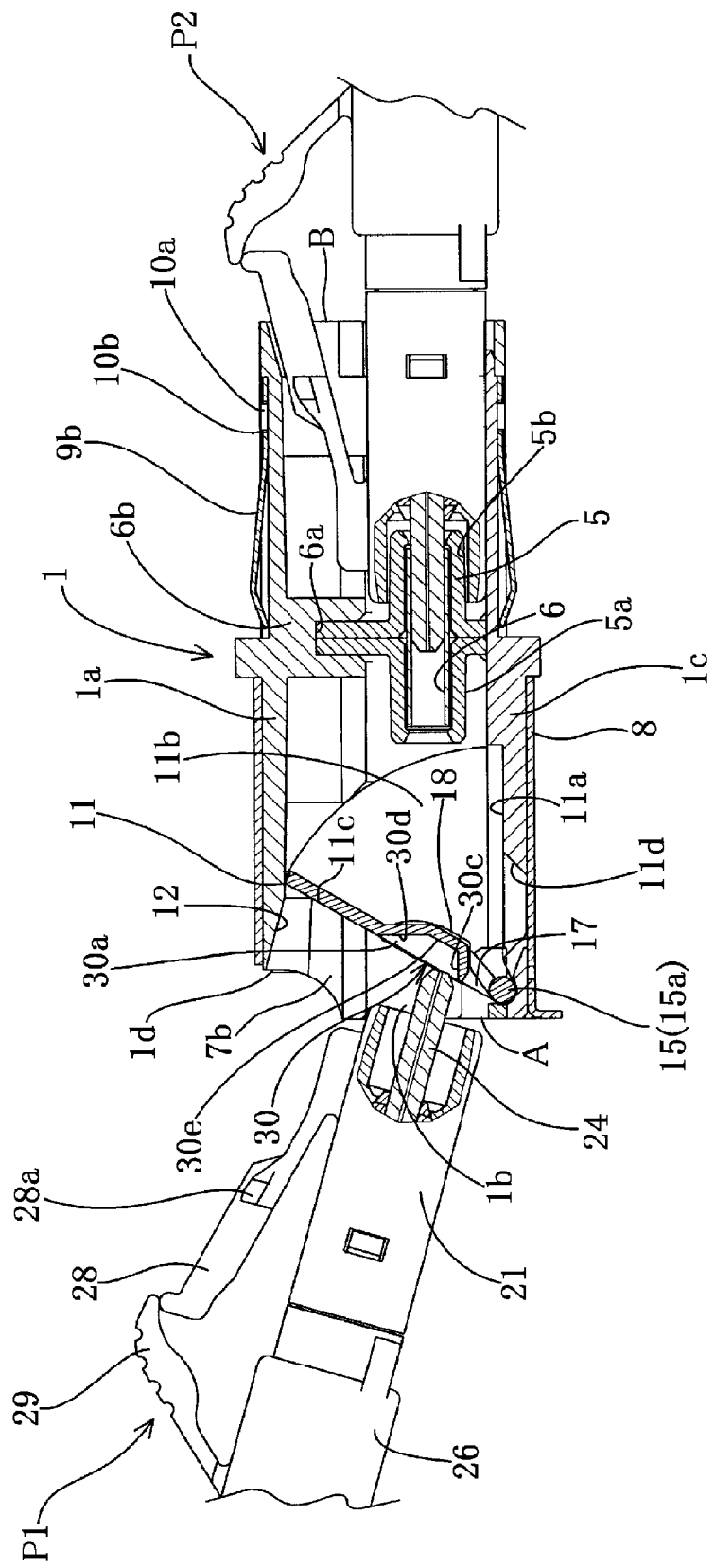
FIG. 6 is a center vertical cross sectional view of a state before an optical connector is inserted into the interconnecting adapter for the LC type optical connectors with shutter from a diagonally upward direction.

As shown in FIG. 6, in the case that the LC type optical connector plug P1 is erroneously inserted into the shutter plate 11 from the diagonally upward direction side before the fitting portion A of the connector housing 1, the shutter plate 11 under closing is pushed by the leading end opening edge portion of the cylindrical coupling sleeve 21 surrounding the periphery of the ferrule 24 without contact of the leading end portion of the ferrule 24 with the front surface of the shutter plate 11 in the clearance 30, and the shutter plate 11 tilts into the inner side of the fitting end against the snapping force of the leaf spring 18. At this time, the side surface of the movable portion of the shutter plate 11 swings the shutter plate 11 itself in the opening direction (to the lower side) while engaging with the right and left fan-type recess portions 11b.

Figure 7:
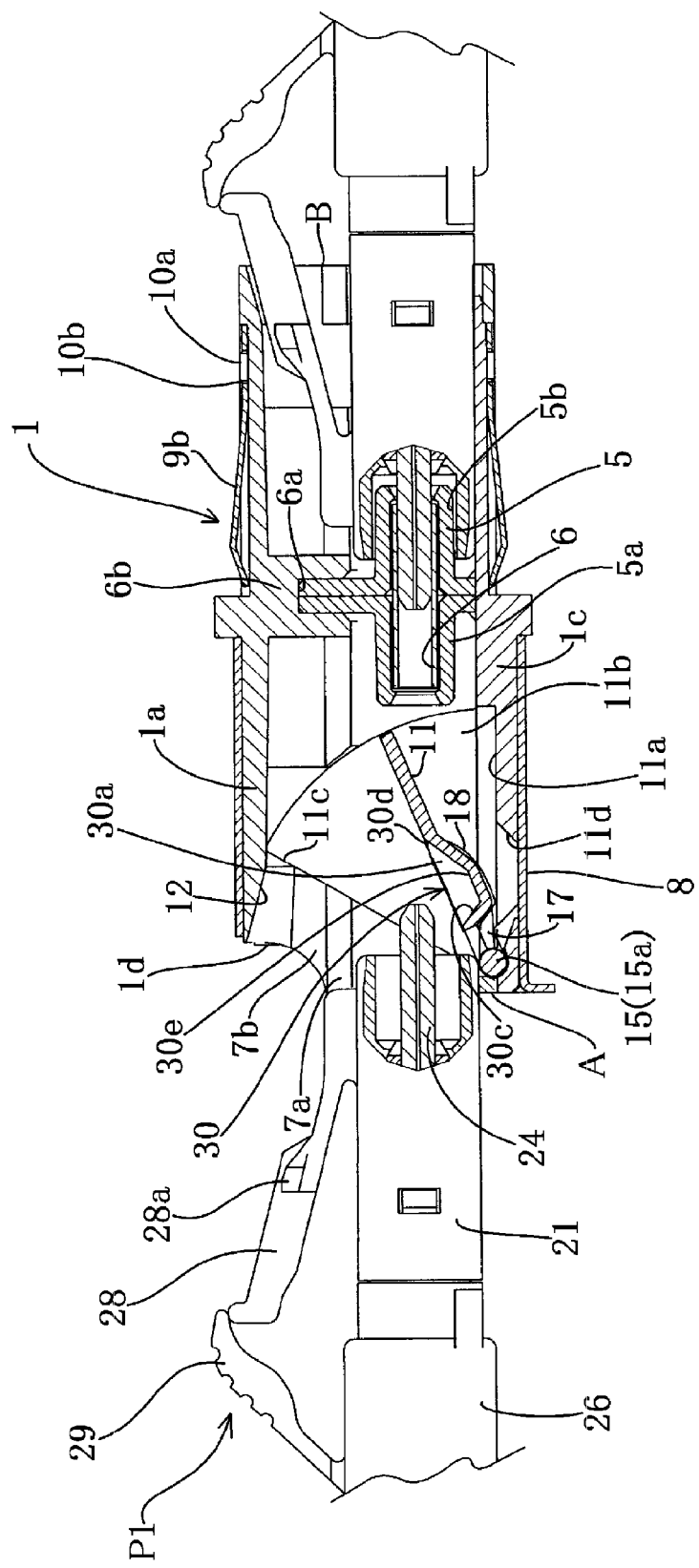
FIG. 7 describes a process in the middle of inserting the LC type optical connector plug into the interconnecting adapter for the LC type optical connectors with shutter, and is a center vertical cross sectional view of a state in which a shutter plate is pressed and tilted by the insertion.
Figure 8:
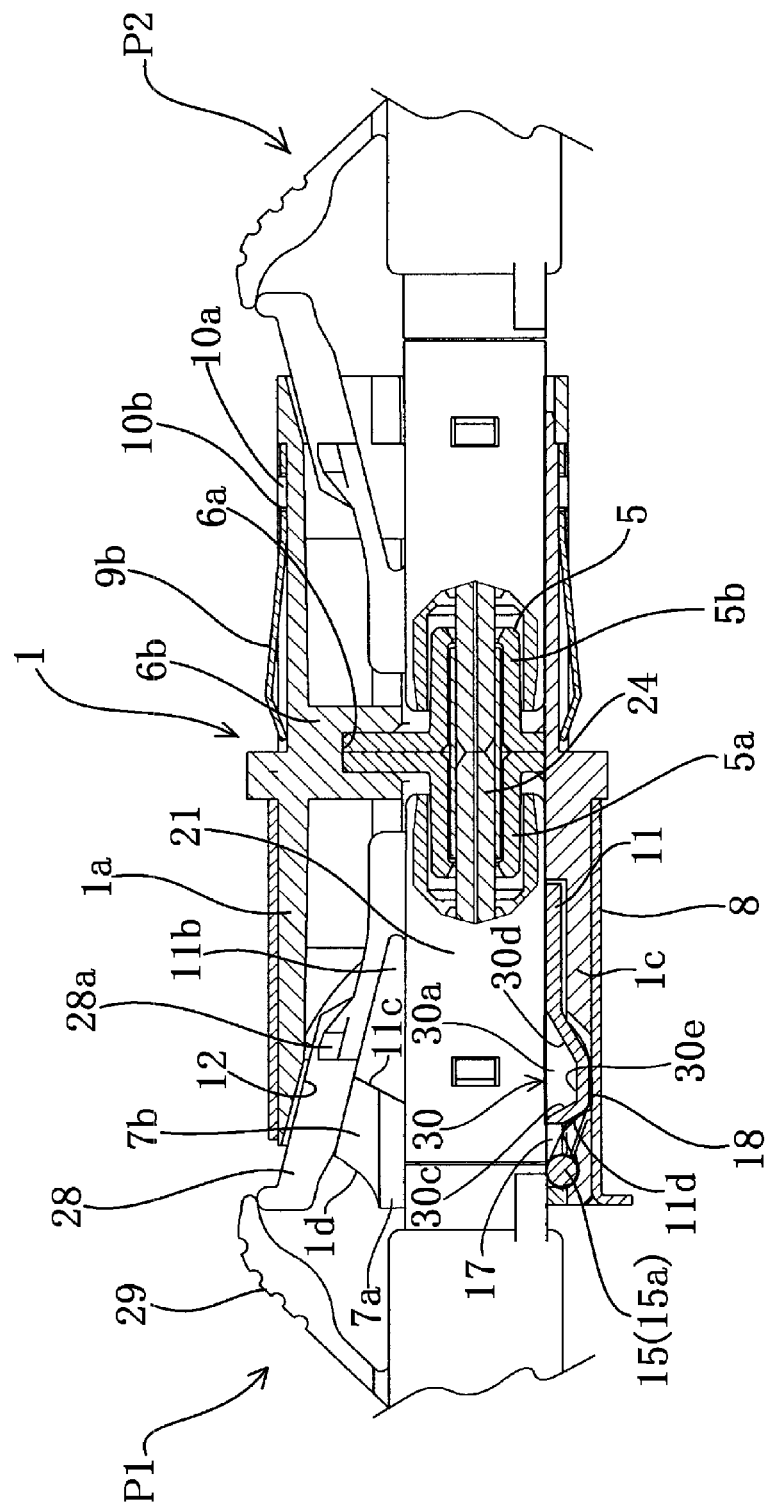
FIG. 8 is a center vertical cross sectional view of a state after the LC type optical connector plug is inserted to the interconnecting adapter for the LC type optical connectors with shutter.

As shown in FIG. 7, in the case that the LC type optical connector plug P1 is further pressed into the fitting portion A of the connector housing 1, the LC type optical connector plug P1 itself is naturally inserted in the horizontal state according to the inserting process, on the basis of the existence of the inward C-shaped concave groove portion 7b with the guide protrusion 7a in its lower side, in addition to the key groove 12 of the fitting portion A in the connector housing 1 mentioned above. Further, in the case that the LC type optical connector plug P1 is completely pressed into the fitting portion A, and the ferrule 24 is fitted to the one side of the sleeve holder 5, there achieves a state in which the LC type optical connector plug P1 is firmly pinched between the shutter plate 11, and the upper side wall 1a of the connector housing 1 by the snapping force of the leaf spring 18, and the connecting work is finished. At this time, the one end of the leaf spring 18 comes to a state in which the one end of the leaf spring 18 is pinched by the rear wall surface of the clearance 30 and the inner surface of the holder 8 in the opening portion 11d.

As described above, in the present embodiment, particularly, since the shutter plate 11 is provided with the clearance 30 for receiving the leading end portion of the ferrule 24 in the non-contact state, the shutter plate 11 can be easily opened without contact of the leading end of the ferrule 24 with the front surface of the shutter plate 11, even in the case that the leading end of the ferrule 24 of the LC type optical connector plug P1 is inserted from the diagonally upward direction side before the fitting portion A of the connector housing 1. As a result, it is possible to prevent the leading end of the ferrule 24 including the core portion from being damaged.

Figure 13:
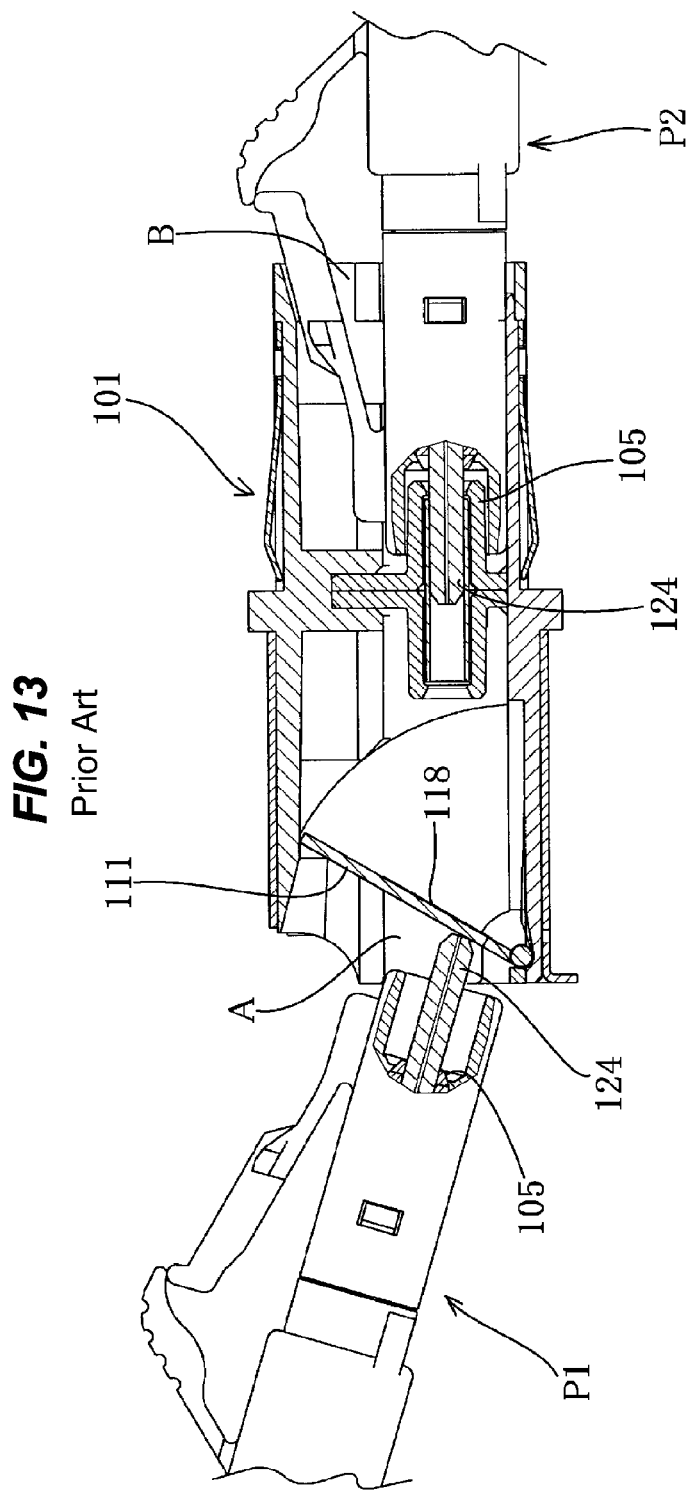
FIG. 13 is a center vertical cross sectional view showing an interconnecting adapter for LC type optical connectors with shutter according to a prior art.

In summary, the present invention intends to prevent the following accident. Even in the conventional tabular shutter plate 11 with no clearance 30 as shown in FIG. 13, the leading end of the ferrule 24 is in the non-contact state with the shutter plate 11 in the stage that the leading end of the LC type optical connector plug P1 is inserted in the horizontal state while being guided by the concave groove portion 7b of the connector housing 1, and no problem is generated. However, at the beginning of the work, that is, in the case that the worker erroneously inserts the leading end of the ferrule 24 from the diagonally upward direction side before the opening portion A of the connector housing 1, there is a risk that the leading end of the ferrule 24 comes into contact with the shutter plate 11. Therefore, the present invention intends to prevent the accident by the provision of the clearance 30 in the shutter plate 11.

What is claimed is:

1. A dust proofing shutter built-in adapter of an LC type optical connector for interconnecting the LC type optical connectors, the adapter comprising:
    fitting portions of LC type optical connector plugs respectively provided in both ends of a connector housing so that optical axes are aligned;
    a sleeve holder installing and retaining each of leading end portions of ferrules of the LC type optical connector plugs inserted from the fitting portions in both ends, the sleeve holder being arranged in an inner portion of the connector housing;
    a shutter plate which is diagonally arranged and closes the fitting portion;
    a leaf spring which energizes the shutter plate in a closing direction;
    the shutter plate and the leaf spring being arranged at least within one fitting portion of said connector housing;
    the LC type optical connector plug being inserted from a fitting portion of said connector housing; and
    a leading end portion of said ferrule being fitted to a sleeve holder while opening said shutter plate against a pressing force of the leaf spring,
    wherein said shutter plate is provided with a clearance for receiving in a non-contact state the leading end portion of the ferrule inserted from a diagonally upward direction side before the fitting portion;
    wherein a bottom wall of the connector housing includes an opening portion configured to receive a rear wall surface of the clearance protruding from a rear surface of the shutter plate.

2. The dust proofing shutter built-in adapter of the LC type optical connector according to claim 1, wherein the clearance is formed into a rectangular shape, a trapezoidal shape, a circular arc shape, a bowl-like recess shape or an opening shape from a front surface side of said shutter plate toward an inner side.

3. The dust proofing shutter built-in adapter of the LC type optical connector according to claim 1, wherein the shutter plate is structured such that the shutter plate is pushed away and opened by a leading end opening edge portion of a coupling sleeve which is provided so as to cover a periphery of the ferrule of the LC type optical connector plug, at the same time of receiving the leading end portion of the ferrule by said clearance in a non-contact state.

4. A dust proofing shutter built-in adapter of an LC type optical connector for interconnecting the LC type optical connectors, the adapter comprising:
    fitting portions of LC type optical connector plugs respectively provided in both ends of a connector housing so that optical axes are aligned;
    a sleeve holder installing and retaining each of leading end portions of ferrules of the LC type optical connector plugs inserted from the fitting portions in both ends, the sleeve holder being arranged in an inner portion of the connector housing;
    a shutter plate which is diagonally arranged and closes the fitting portion;
    a leaf spring which energizes the shutter plate in a closing direction;
    the shutter plate and the leaf spring being arranged at least within one fitting portion of said connector housing;
    the LC type optical connector plug being inserted from a fitting portion of said connector housing; and
    a leading end portion of said ferrule being fitted to a sleeve holder while opening said shutter plate against a pressing force of the leaf spring;
    wherein said shutter plate is provided with a clearance for receiving in a non-contact state the leading end portion of the ferrule inserted from a diagonally upward direction side before the fitting portion;
    wherein the clearance is formed into a rectangular shape, a trapezoidal shape, a circular arc shape, a bowl-like recess shape or an opening shape from a front surface side of said shutter plate toward an inner side; and
    wherein the shutter plate is structured such that the shutter plate is pushed away and opened by a leading end opening edge portion of a coupling sleeve which is provided so as to cover a periphery of the ferrule of the LC type optical connector plug, at the same time of receiving the leading end portion of the ferrule by said clearance in a non-contact state.

* * * * *